Nov. 1, 1932. C. HARAZIN 1,885,437
COTTON ELEVATOR
Filed May 11, 1931
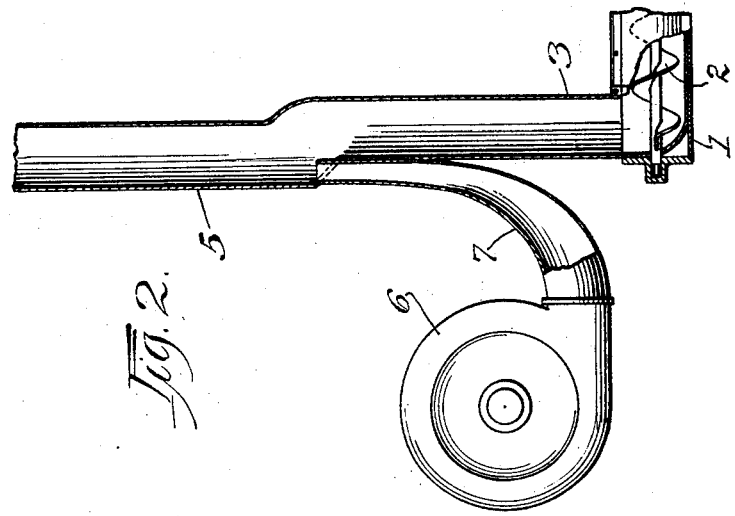
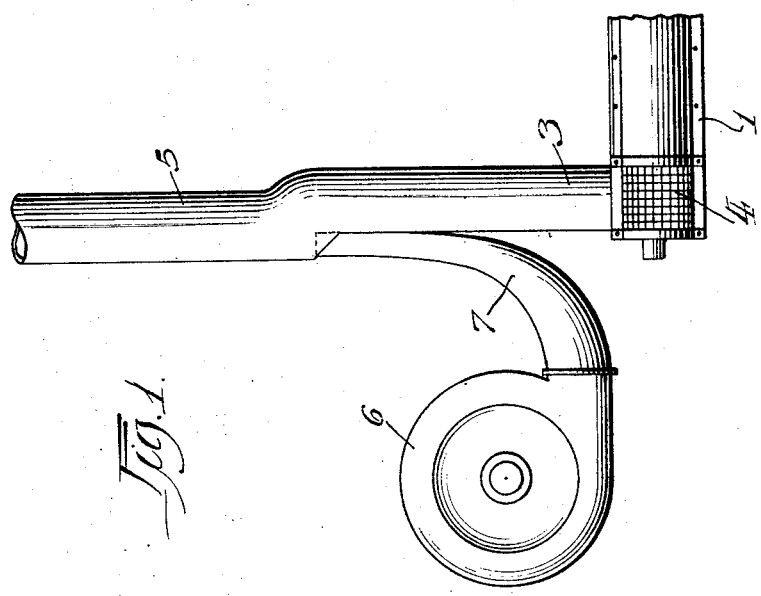

Patented Nov. 1, 1932

1,885,437

UNITED STATES PATENT OFFICE

CHARLES HARAZIN, OF CHICAGO, ILLINOIS, ASSIGNOR TO G. R. MEYERCORD, OF CHICAGO, ILLINOIS

COTTON ELEVATOR

Application filed May 11, 1931. Serial No. 536,384.

Machines have been devised to harvest cotton automatically, the cotton being collected from the plants as the machines pass across the field. The cotton thus gathered must be carried away from the gathering point into a receptacle that may be located at a considerable distance from such point. About the simplest way of carrying away the cotton is to cause it to be drawn by suction through a conduit extending away from a trough or other container into which the cotton is initially delivered from the picking elements. Considerable volumes of air are required for this purpose and, therefore, it has been proposed to place the inlet conduit of a blower in position to take up the cotton with the incoming air; the cotton passing through the blower and being discharged through an outlet conduit which delivers it to the storage point. However, in passing through the blower there is more or less tearing of the fiber of the cotton and crushing of the cotton seed. While there is more or less tearing of the fiber at all times, when the cotton is handled in this way, it becomes a serious matter where the cotton is wet. The object of the present invention is to make it possible to convey the cotton pneumatically in a simple and efficient manner without injury to the fiber or to the seed.

In carrying out my invention, I cause the cotton to take a path that carries it through a conduit without passing through the blower; the blower simply forcing air through the conduit in the direction of the outlet from the conduit at a point spaced at some distance inwardly from the inlet end of the conduit. The air forced through the conduit in this way lowers the pressure within the inlet end, so that outside air, and with it the cotton, is drawn in until it enters the stream of air by which the suction is induced and is then carried along with such stream to the discharge point.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is an elevation of so much of my improved pneumatic cotton handling apparatus as is necessary to explain the construction and principle thereof; and Fig. 2 is a view similar to Fig. 1, parts being in section.

Referring to the drawing, 1 represents a trough, closed at one end and open at the top at said end. This trough, in a cotton harvesting machine, will be placed in the proper position to receive the cotton as it is doffed by the picker elements. Within the trough is a suitable conveyor 2 that carries the cotton along the trough toward the closed end. Extending across the open top of the trough, at said closed end, is a conduit 3 of large cross sectional area. If desired, there may be an opening in the side of the trough just below the conduit, this opening being spanned by a suitable screen 4. At some distance above the trough the conduit is stepped laterally, preferably a distance equal to about half the diameter of the conduit. Therefore, the lower end of the upper section 5 of the conduit may be said to overhang or project beyond one side of the lower section. In accordance with my invention, I force air upwardly through this overhanging portion of the conduit. This may be conveniently accomplished by employing a suitable blower 6 whose discharge conduit or pipe 7 extends upwardly beside the lower section of the conveyor conduit and opens upwardly into the overhang. The volume and pressure of the air delivered by the blower being great enough, the cotton will be drawn up until it enters the stream from the blower, whereupon it will be forcibly impelled along the conduit. The outlet or discharge pipe from the blower preferably decreases in cross section area toward its outlet end so as to increase the velocity of the air before it is finally delivered into the conduit.

It will be thus seen that the cotton is picked up and carried along the conduit through the action of air currents alone and without being subjected to blows such as would be encountered in passing through the blower; and, consequently, there will be no damage to the fiber or to the seed. It will also be seen that, if the blower is kept running, the cotton will be removed from the trough as fast as it is delivered by the picking mechanism, so that the cotton will not be given an opportunity to become solidly packed in the trough with resulting injury to the fiber and seed and clogging of the pneumatic conveyor. Not only is the cotton effectively handled by my improved pneumatic apparatus but, in the case of wet cotton, an important drying action takes place, due to the flow of air past and through the loose masses of fiber in transit. One of the purposes of my invention, therefore, may be said to dry wet cotton by means of air which carries it from one point to another.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In a cotton handling apparatus, a container for cotton, a conduit of large cross sectional area rising from and stepped laterally at some distance above the container, a blower, and a discharge pipe leading from the blower upwardly into the overhanging portion of the conduit at such step.

2. In a cotton handling apparatus, a container for cotton, a conduit of large cross sectional area rising from and stepped laterally at some distance above the container, a blower, and a discharge pipe leading from the blower upwardly into the overhanging portion of the conduit at such step, said discharge pipe decreasing in cross sectional area as the distance from the blower increases.

3. In a cotton handling apparatus, a container for cotton, a conduit of large cross sectional area rising from and stepped laterally a distance about equal to one-half of its diameter at a point above the container, a blower, and a discharge pipe extending from the blower beside the lower part of the conduit and opening into the bottom of the overhanging portion of the conduit.

4. In a machine of the character described, a trough, a conveyor for moving cotton along the trough to one end thereof, a conduit open at the bottom extending across the top of and rising from said end of the trough, said conduit being stepped laterally at a point above the trough, a blower, and a discharge pipe extending from the blower along the lower part of the conduit and opening upwardly into the bottom of the overhanging part of the conduit.

In testimony whereof, I sign this specification.

CHARLES HARAZIN.